United States Patent [19]

Stone

[11] 3,728,563
[45] Apr. 17, 1973

[54] BEARING SUPPORT AND OIL RETAINER FOR DYNAMO-ELECTRIC MACHINES

[75] Inventor: Thomas W. Stone, Owosso, Mich.

[73] Assignee: Franklin Electric Co., Inc., Bluffton, Ind.

[22] Filed: Aug. 23, 1971

[21] Appl. No.: 173,807

[52] U.S. Cl. ...................... 310/90, 29/596, 310/91
[51] Int. Cl. ............................................. H02k 5/16
[58] Field of Search ................... 310/90, 42, 85, 89, 310/91; 29/421 M, 596, 597, 598; 307/72, 132; 72/56

[56] References Cited

UNITED STATES PATENTS

| | | | |
|---|---|---|---|
| 2,982,873 | 5/1961 | Simmons | 310/42 |
| 2,886,380 | 5/1959 | Lambeek | 308/72 |
| 3,497,735 | 2/1970 | Diederichs | 310/90 |
| 3,431,625 | 3/1969 | Schenk | 29/421 |
| 3,432,700 | 3/1969 | Diederichs | 310/42 |
| 3,013,167 | 12/1961 | Bobula | 310/90 |
| 3,483,409 | 12/1969 | Phillips | 310/90 |

*Primary Examiner*—R. Skudy
*Attorney*—Donald Brott and Lowell C. Noyes

[57] ABSTRACT

A tubular member has an elongated body with a flange at one end attached to the end frame of a dynamoelectric machine and its opposite end having an inturned lip. One or more spherical bearings are positioned within the tubular body and the tubular body is shaped to engage the outer spherical surfaces of the bearing, or bearings, to hold the bearing in place. The tubular body is preferably shaped to conform to the outer bearing spherical surfaces by pulse forming with a magnetic coil. An oil retaining body is also positioned within the tubular body. The bearing support arrangement is utilized with a through shaft construction and a unit bearing construction.

7 Claims, 6 Drawing Figures

PATENTED APR 17 1973
3,728,563
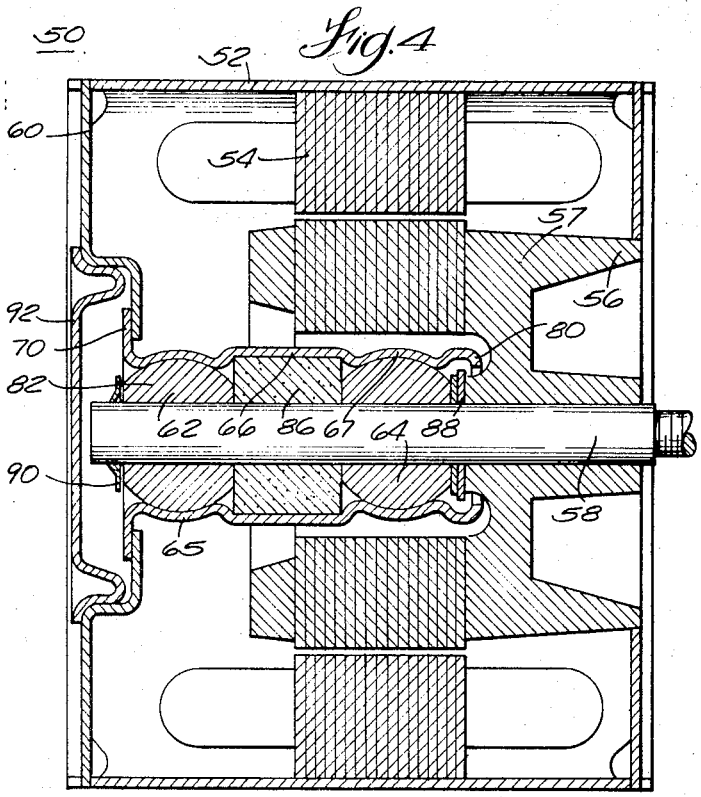
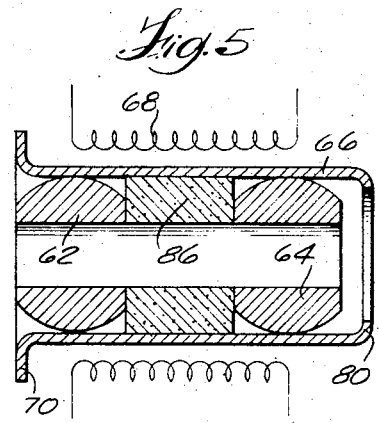
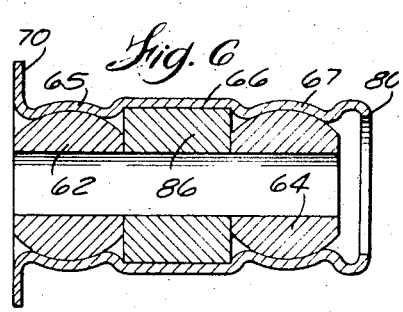
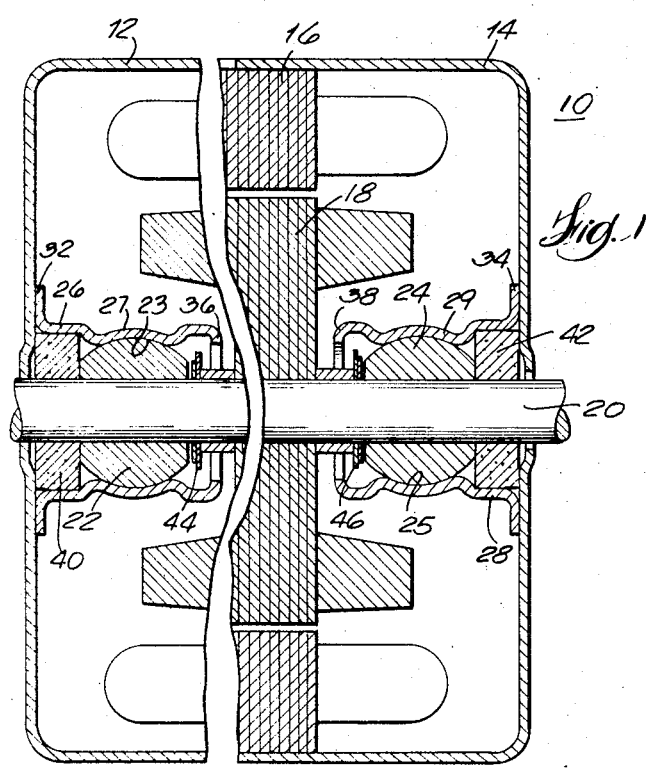
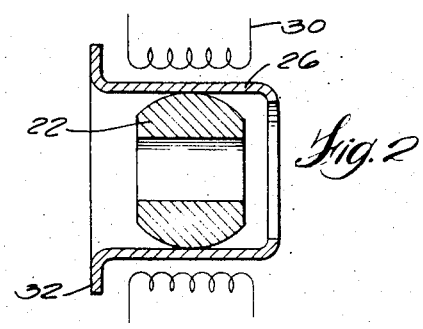
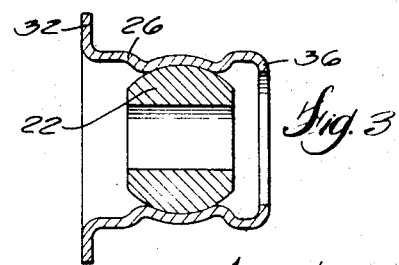
Inventor
Thomas W. Stone
By Joseph A. Genigian
Attorney

BEARING SUPPORT AND OIL RETAINER FOR DYNAMO-ELECTRIC MACHINES

This invention relates to dynamoelectric machines and, more particularly, to bearing support arrangement for such machines.

Current practice in the manufacture of electric motors is to provide an end frame assembly consisting of a basic end frame member having a ball seat, a bearing, felt, a bearing retainer spring, and an internal oil catcher. Such constructions are generally disadvantageous, particularly in the micro-horsepower range, as they require a number of parts and there is a build up of tolerances between the I.D. of the bearing and the register of the end frame with the stator. This build up of tolerances is undesirable from the standpoint of air gap control.

The common practice in connection with unit bearing motors is to provide a basic casting which supports a pair of sleeve bearing in a hub of that casting. Oil systems are either assembled into the rotor or assembled over the bearing retainer hub which requires extensive machining operations as well as a generally complex structure.

This invention is concerned with the problem of complexity in the structure of dynamoelectric machinery and, also, the provision of a bearing support arrangement for such machinery of simple and yet reliable construction.

Accordingly, an object of this invention is to provide a more efficient and effective bearing support arrangement for electric motors.

Another object is to provide a bearing support arrangement which, with a minimum of parts, provides the support for bearings and the oil system and is simple to fabricate and yet provides the precision desired in dynamoelectric machines.

A further object of this invention is to provide a bearing support arrangement which is equally adapted to all forms of dynamoelectric machines, including unit bearing motors.

Still a further object of this invention is to provide an improved method of assembling bearings, and/or a desired oil system in a dynamoelectric machine.

For the achievement of these and other objects, this invention proposes a bearing support arrangement wherein an elongated generally tubular member is positioned around a spherical bearing, or bearings, and has the walls of that member shaped to conform to the outer walls of the spherical bearing to thereby hold the spherical bearing in position. One end of the tubular member is preferably provided with an outwardly extending flange portion which attaches directly to the end frame of the dynamoelectric machine, and, preferably, the opposite end of the tubular member has an inturned lip which provides clearance for the machine shaft but also extends inwardly sufficiently to provide an internal oil catcher ring. Where the lubrication system for the machine utilizes an oil impregnated felt, that felt is also positioned within the tubular body.

Preferably, the assembly of the bearings and tubular body is achieved by positioning the bearing, or bearings, within the body prior to the body having the outer bearing surface engaging portions formed therein. After the bearings have been suitably located along the longitudinal axis of the body, the walls of the body are deformed, preferably by magnetic pulse forming, to securely engage the outer surfaces of the bearings.

Other objects and advantages will be pointed out in, or be apparent from, the specification and claims, as will obvious modifications of the embodiments shown in the drawings in which:

FIG. 1 is an axial section through an electric motor embodying this invention;

FIG. 2 is an axial section of the bearing support arrangement with the bearing in place prior to deforming the tubular member;

FIG. 3 is an axial section through the arrangement of FIG. 2 after pulse forming of the member;

FIG. 4 is an axial section through an alternative electric motor arrangement, i.e. a unit bearing motor, embodying this invention;

FIG. 5 is an axial section through the bearing support arrangement of the motor of FIG. 4 and prior to deforming the walls of the tubular member; and FIG. 6 is an axial section of the assembly of FIG. 5 after pulse forming.

DESCRIPTION OF PREFERRED EMBODIMENT

With particular reference to the drawings, electric motor 10 is illustrated in FIG. 1 as including an outer housing consisting of opposed cup shaped end member 12 and 14. The end members are joined to stator core 16 and a rotor 18 is supported concentrically in stator 16. An air gap is provided between the outer diameter of the rotor and the inner diameter of the stator. A shaft 20 is fixed in rotor 18 and is supported by bearings, to be described more completely hereinafter, for rotation relative to stator 16. Bearings 22 and 24 engage shaft 20 at axially spaced points thereon and are supported within generally tubular members 26 and 28, respectively. The tubular members 26 and 28 are arranged so that the longitudinal axes thereof are parallel to the axis of rotation of rotor 18, as illustrated coincident with that axis.

Bearings 22 and 24 have a cylindrical bore engaging the shaft, and, also have semi-spherical surfaces, 23 and 25. The outer semi-spherical surfaces are engaged by deformed portions 27 and 29 of members 26 and 28. The deformed portions are also generally semi-spherical to conform to the outer surfaces of the bearings. The engagement of the complimentary outer surfaces of the bearings and the deformed portions of the body members 26 and 28 act to hold these bearings against axial movement relative to shaft 20 and yet permit limited movement of the bearings so that a self-aligning bearing arrangement is provided.

Tubular member 26 includes at one end a radially outwardly projecting flange 32, this flange can be in the form of a continuous annular ring or can be a series of spaced radial tabs. Similarly, body member 28 includes a radially outward projecting flange 34. These flanges 32 and 34 are connected directly to the end frame portions of housing members 12 and 14 to thereby connect the bearing arrangement in the motor structure. Preferably, 32 and 34 are spot welded to the housing members to provide a precise concentric relationship between the bore of the bearings and the inner bore of stator 16. For example as disclosed and claimed in U.S. Pat. No. 3,483,409 assigned to the assignee of this application.

Prior to connection of the members 26 and 28 to the housing members, felt bodies 40 and 42 are positioned on the shaft in engagement with the bearings. In the final assembly, these felt bodies are held captive between the bearings and the outer end frame portion. The felt bodies are impregnated with oil to provide the basic lubrication for the motor bearings. The portion of the end frame assembly engaging the felt members acts as an outer oil catcher and the inturned lips 36 and 38 act as internal oil catcher rings.

Washer assemblies 44 and 46 are provided between the axial ends of rotor 18 and the bearings to provide for basic end play adjustment.

Preferably, body members 26 and 28 are deformed to engage the outer surfaces of the semi-spherical bearings by means of a conventional magnetic pulse forming operation. This operation is illustrated in FIGS. 2 and 3 in connection with body member 26. More particularly, bearing 22 is positioned within body member 26 while the body member still has its straight cylindrical shape. With the bearing properly located within the body, that assembly is positioned within magnetic coils 30 so that when the coils energized the body member and bearing assembly are within the magnetic field generated by those coils and the body member will be deformed, as illustrated in FIG. 3, to securely engage the spherical bearings. The magnetic pulse forming arrangement is preferred as it is a relatively simple and yet effective method of providing the connection between the body members and the bearings.

As can be seen, the arrangement discussed to this point provides a relatively simple motor construction wherein all of the parts can be stamped parts and the number of parts required is greatly reduced. For example, the tubular members 26 and 28 provide the retainer for the bearings while also cooperating to provide the oil retainer system as well as the internal oil catcher.

FIG. 4 illustrates the bearing retaining arrangement of this invention in connection with a unit bearing motor 50. A cylindrical outer shell 52 supports stator 54 and a rotor 56 is supported for rotation by a bearing arrangement, to be described hereinafter, within stator 54. Rotor 56 includes a casting 57 to which is attached shaft 58. The bearing arrangement for the motor is supported from the left end frame 60 which in turn is connected to shell 52. Bearings 82 and 64 have cylindrical internal bores engaging shaft 58 and are provided with outer semi-spherical surfaces which are engaged by deformed portions 65 and 67 of elongated tubular member 66. Deformed portions 65 and 67 of the tubular member 66 have a configuration which conforms to the outer semi-spherical surfaces of bearings 62 and 64 and thereby hold the bearings in axial spaced relationship with respect to shaft 58 and against axial movement relative to that shaft.

A radially outward projecting flange 70 is provided on one end of tubular body 66 and its opposite end has an inturned lip 80. Flange 70 is connected to end frame 60, for example in the same manner as described in connection with the embodiment of FIGS. 1–3. A felt member 86 is positioned between bearings 62 and 64 and is held in position by the bearings. The felt body is oil impregnated and provides the lubrication for the motor. End play washer assembly 88 is provided between bearing 64 and engages a shoulder on 57 of the rotor and a spring retaining clip 90 is provided at the opposite axial end of shaft 58 to complete the shaft and bearing arrangement assembly.

In the assembly, bearings 62 and 64 are positioned within the tubular body 66 before that body is deformed to provide portions 65 and 67. Felt body 86 is located between the bearings. The resulting assembly is positioned relative to coil 68 so that when the coil is energized, the body 66 will be deformed so as to provide portions 65 and 67 around the outer semi-spherical surfaces of the bearings.

To complete the unit bearing assembly an end cap 92 is connected to end frame 60.

It will be appreciated that the coils providing the magnetic pulse forming are positioned relative to the tubular members 26, 28, or 66 such that only the portions immediately adjacent the bearings are deformed.

Although two embodiments of the present invention have been illustrated and described, it will be apparent to those skilled in the art that various changes and modifications may be made therein without departing from the spirit of the invention or from the scope of the appended claims.

I claim:

1. In a dynamoelectric machine including a rotor and a stator the combination of
   an end frame portion,
   a generally elongated, tubular shaped member attached to said end frame portion and having its longitudinal axis extending in the direction of the axis of rotation of said rotor,
   a shaft connected to said rotor and extending into said tubular member,
   at least one bearing disposed in said tubular member and having an interior bore engaging said shaft and an exterior surface including a portion which is semi-spherical in shape with respect to the axis of said bearing bore, and
   said tubular member having deformed portions therein engaging said semi-spherical portions of said bearing to hold said bearing in said tubular member and against axial movement relative to said shaft, said tubular member including, at one of the longitudinal ends thereof, means extending radially outward relative to the axis of said body member and being connected to said end frame portion to thereby provide the support connection for said tubular member and said bearing in said dynamoelectric machine structure.

2. The combination of claim 1 wherein said tubular member includes at the opposite longitudinal end thereof an inturned lip extending radially relative to the axis of said elongated body member.

3. In a dynamoelectric machine including a rotor and a stator the combination of
   an end frame portion,
   a generally elongated, tubular shaped member attached to said end frame portion and having its longitudinal axis extending in the direction of the axis of rotation of said rotor,
   a shaft connected to said rotor and extending into said tubular member, at least one bearing disposed in said tubular member and having an interior bore engaging said shaft and an exterior surface including a portion which is semi-spherical in shape with respect to the axis of said bearing bore, and said tubular member having deformed portions therein engaging said semi-spherical portions of said bearing to hold said bearing in said tubular member and against axial movement relative to said shaft, said dynamoelectric machine being a unit bearing motor and said rotor including means defining a casting and a shaft connected in said casting, said shaft extending axially and being surrounded by said tubular member, and said bearing being engaged with said shaft and held in position by said tubular member, and first and second bearings disposed within said tubular member in axially spaced relation relative to each other, said first and second bearings both including an outer surface having a semi-spherical in cross section portion, and wherein said tubular member includes first and second deformed portions one engaging each of the outer semi-spherical surface portions of said first and second bearings.

4. The unit bearing motor of claim 3 wherein said tubular member includes, at one of the longitudinal ends thereof, means extending radially outward relative to the axis of said tubular body member and connected to the end frame portion of said unit bearing motor to form the connection between said tubular member and said end frame portion in said unit bearing motor.

5. The combination of claim 4 wherein said tubular member includes at the opposite longitudinal end thereof an inturned lip extending radially relative to the axis of said tubular member.

6. The combination of claim 3 including means defining a porous body within said tubular member between said bearings and impregnated with a liquid lubricant.

7. The combination of claim 6 including an end cap attached to said end frame portion generally centrally thereof to cover the shaft extension of said unit bearing motor and to act as an external oil retainer ring.

* * * * *